(12) United States Patent
Motomura

(10) Patent No.: US 12,480,673 B2
(45) Date of Patent: Nov. 25, 2025

(54) AIR-CONDITIONING APPARATUS

(71) Applicant: Mitsubishi Electric Corporation, Tokyo (JP)

(72) Inventor: Yuji Motomura, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 79 days.

(21) Appl. No.: 18/554,222

(22) PCT Filed: Jun. 18, 2021

(86) PCT No.: PCT/JP2021/023182
§ 371 (c)(1),
(2) Date: Oct. 6, 2023

(87) PCT Pub. No.: WO2022/264399
PCT Pub. Date: Dec. 22, 2022

(65) Prior Publication Data
US 2024/0183552 A1   Jun. 6, 2024

(51) Int. Cl.
*F24F 11/36*   (2018.01)

(52) U.S. Cl.
CPC .................. *F24F 11/36* (2018.01)

(58) Field of Classification Search
CPC ............. F25B 13/00; F25B 2313/0233; F25B 2400/12; F25B 2500/222; F25B 49/005
See application file for complete search history.

(56) References Cited

U.S. PATENT DOCUMENTS

| | | | |
|---|---|---|---|
| 2013/0192283 A1* | 8/2013 | Yamashita | F24F 3/08 62/126 |
| 2017/0223478 A1* | 8/2017 | Jot | G10L 19/20 |
| 2018/0180338 A1 | 6/2018 | Honda et al. | |
| 2018/0315435 A1* | 11/2018 | Goodwin | G10L 19/0212 |
| 2018/0316923 A1* | 11/2018 | Stachurski | H04N 19/15 |

(Continued)

FOREIGN PATENT DOCUMENTS

| | | | |
|---|---|---|---|
| EP | 3633282 A1 | | 4/2020 |
| JP | 2021-076339 | * | 5/2020 |

(Continued)

OTHER PUBLICATIONS

Extended European Search Report dated Jun. 28, 2024 issued in corresponding European patent application No. 21946074.8.

(Continued)

*Primary Examiner* — Henry T Crenshaw
(74) *Attorney, Agent, or Firm* — Posz Law Group, PLC

(57) ABSTRACT

An air-conditioning apparatus includes an indoor unit that cools or heats an air-conditioning target space; an outdoor unit that supplies heating energy or cooling energy to the indoor unit; a refrigerant shut-off unit that shuts off supply of refrigerant to the indoor unit; a refrigerant sensor that detects refrigerant leaking from the indoor unit; a space detector that detects information regarding a volume of a space where the indoor unit is installed; and a controller. The controller determines whether or not the space where the indoor unit is installed is a small space based on a detection result from the space detector, and energizes the refrigerant sensor when the space where the indoor unit is installed is the small space.

18 Claims, 10 Drawing Sheets

(56) References Cited

U.S. PATENT DOCUMENTS

| | | | |
|---|---|---|---|
| 2020/0318840 A1 | 10/2020 | Wada et al. | |
| 2020/0318875 A1* | 10/2020 | Yamada | F25B 6/02 |
| 2022/0065506 A1 | 3/2022 | Yajima | |
| 2022/0214062 A1* | 7/2022 | Hirai | F24F 11/77 |

FOREIGN PATENT DOCUMENTS

| | | |
|---|---|---|
| JP | 2020-122646 A | 8/2020 |
| JP | 2020-181616 A | 11/2020 |
| JP | 2021-076339 A | 5/2021 |
| WO | 2016/208470 A1 | 12/2016 |
| WO | 2018/216127 A1 | 11/2018 |

OTHER PUBLICATIONS

International Search Report of the International Searching Authority mailed Sep. 7, 2021 for the corresponding International Application No. PCT/JP2021/023182 (and English translation).

* cited by examiner

AIR-CONDITIONING APPARATUS

CROSS REFERENCE TO RELATED APPLICATION

This application is a U.S. national stage application of PCT/JP2021/023182 filed on Jun. 18, 2021, the contents of which are incorporated herein by reference.

TECHNICAL FIELD

The present disclosure relates to an air-conditioning apparatus including safety measures for refrigerant leakage.

BACKGROUND ART

In a conventional air-conditioning apparatus using mildly flammable refrigerant or flammable refrigerant, when the volume of an air-conditioning target space such as a living room where an indoor unit is installed is relatively small, the air-conditioning apparatus is required to be provided with safety measures for possible refrigerant leakage from a device, a pipe, or the like. For example, Patent Literature 1 discloses an air-conditioning apparatus including a refrigerant leakage detector and a refrigerant shut-off valve that can block refrigerant from flowing into an indoor unit as the safety measures for refrigerant leakage.

In the air-conditioning apparatus including the refrigerant shut-off valve, when refrigerant leakage has occurred in an air-conditioning target space, the refrigerant shut-off valve is activated to avoid the refrigerant concentration in the space from exceeding a reference value, thereby to prevent leakage of the whole amount of refrigerant in the air-conditioning apparatus. However, there is a case where the air-conditioning target space has a sufficiently large volume, and thus even if the whole amount of refrigerant in the air-conditioning apparatus leaks, the refrigerant concentration in the space still may not exceed the reference value. In that case, installation of the safety measures such as the refrigerant shut-off valve is not required.

CITATION LIST

Patent Literature

Patent Literature 1: Japanese Unexamined Patent Application Publication No. 2020-122646

SUMMARY OF INVENTION

Technical Problem

Although the air-conditioning target space has a sufficiently large volume, when this space is used as, for example, a tenant space, a partition or the like may be added to the space depending on the necessary space volume for users' convenience after installation of the indoor unit. In this case, in a newly created space defined by the partition or the like, the average concentration of refrigerant may exceed the reference value if the refrigerant leaks.

The present disclosure has been made to solve the above problems, and it is an object of the present disclosure to provide an air-conditioning apparatus that can still ensure safety for refrigerant leakage even when there is a change in volume of a space where an indoor unit is installed.

Solution to Problem

An air-conditioning apparatus according to an embodiment of the present disclosure includes: an indoor unit configured to cool or heat an air-conditioning target space; an outdoor unit configured to supply heating energy or cooling energy to the indoor unit; a refrigerant shut-off unit configured to shut off supply of refrigerant to the indoor unit; a refrigerant sensor configured to detect refrigerant leaking from the indoor unit; a space detector configured to detect information regarding a volume of a space where the indoor unit is installed; and a controller configured to determine whether or not the space where the indoor unit is installed is a small space based on a detection result from the space detector, and energize the refrigerant sensor when the space where the indoor unit is installed is the small space.

Advantageous Effects of Invention

In the air-conditioning apparatus according to an embodiment of the present disclosure, the space detector detects the volume of a space where the indoor unit is installed, and when the space is a small space, the refrigerant sensor is energized. Consequently, even when there is a change in the volume of the air-conditioning target space, the air-conditioning apparatus can still ensure safety for refrigerant leakage.

DESCRIPTION OF EMBODIMENTS

Figure 1:
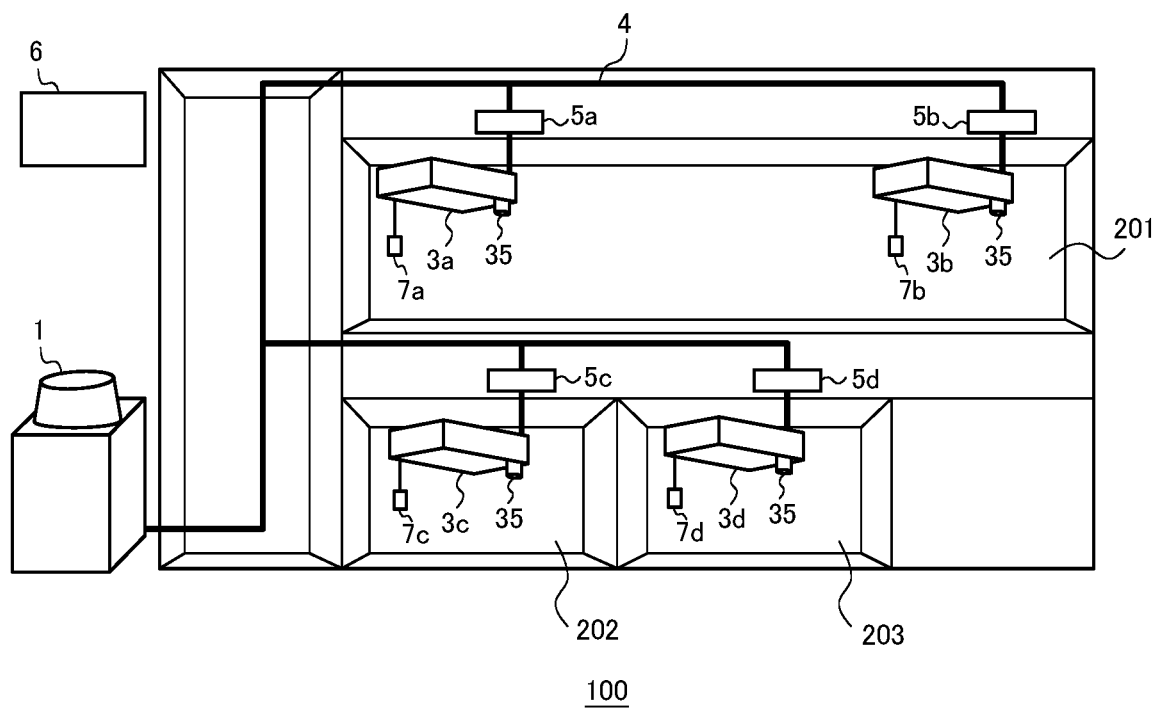
FIG. 1 is a schematic configuration diagram of an air-conditioning apparatus according to Embodiment 1.

Hereinafter, embodiments will be described with reference to the drawings. Note that in the drawings below, the same reference signs denote the same or equivalent components, which are common throughout the entire specification. Further, the forms of the components described throughout the entire specification are merely examples, and do not intend to limit the components to the forms described in the specification. Furthermore, the relationship of sizes of the components in the drawings described below may differ from that of actual ones.

Embodiment 1

Figure 2:
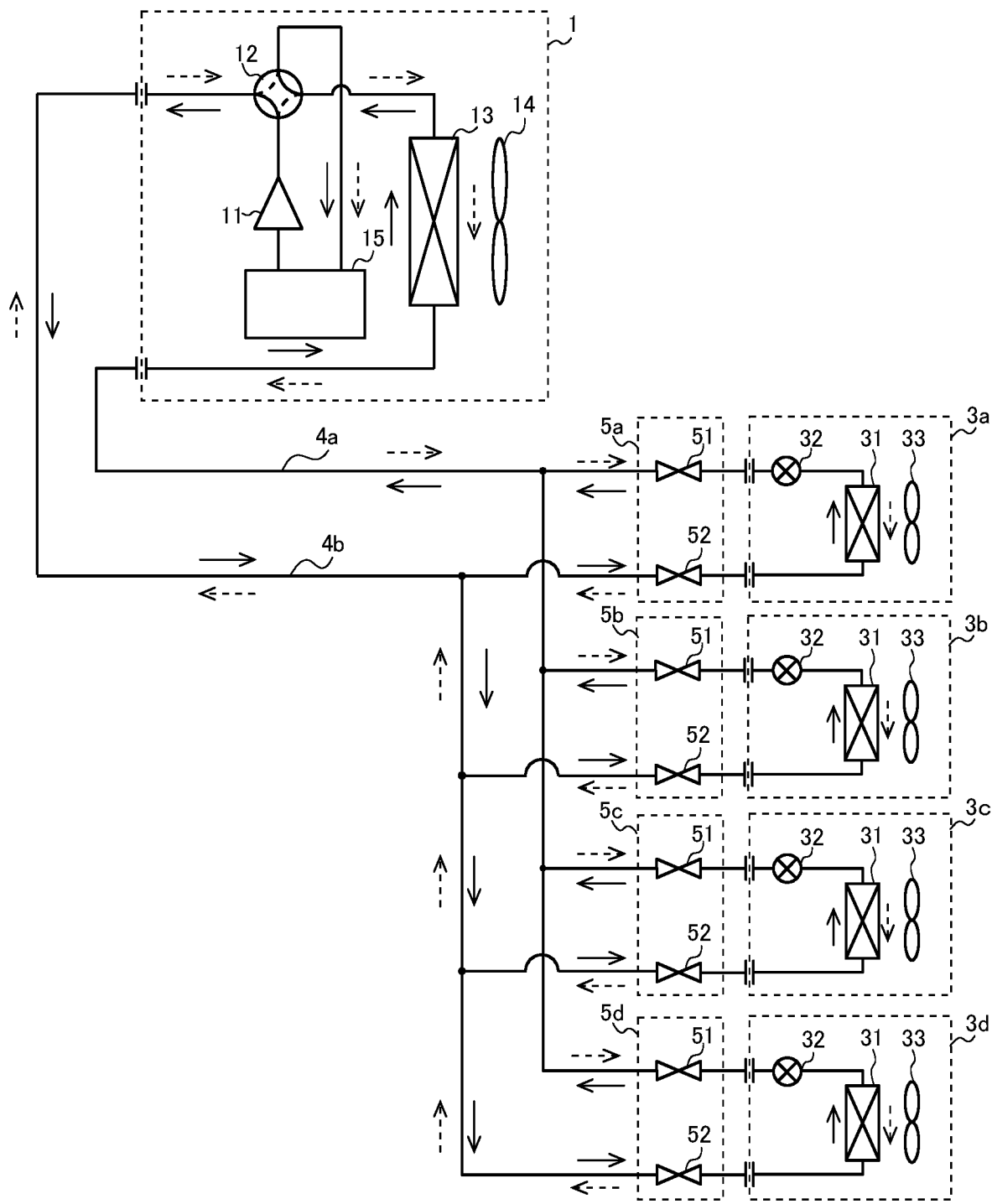
FIG. 2 is a refrigerant circuit diagram of the air-conditioning apparatus according to Embodiment 1.

FIG. 1 is a schematic configuration diagram of an air-conditioning apparatus 100 according to Embodiment 1. As illustrated in FIG. 1, the air-conditioning apparatus 100 in the present embodiment is, for example, a multi-air conditioner for building, and includes an outdoor unit 1 and a plurality of indoor units 3a to 3d. The outdoor unit 1 is connected to each of the indoor units 3a to 3d by a refrigerant pipe 4. The refrigerant pipe 4 includes refrigerant pipes 4a and 4b that will be described later (FIG. 2). While the air-conditioning apparatus 100 in the present embodiment includes four indoor units 3a to 3d, the number of indoor units may be one to three, or may be equal to or larger than five.

The outdoor unit 1 is installed outside an air-conditioning target space such as the outside of a building, and supplies heating energy or cooling energy to the indoor units 3a to 3d. Each of the indoor units 3a to 3d is installed in the air-conditioning target space such as a room of the building, and cools or heats the air-conditioning target space. In the example in FIG. 1, the indoor units 3a and 3b are installed in a room 201, while the indoor units 3c and 3d are installed respectively in rooms 202 and 203. The room 201 is a relatively large space, while the rooms 202 and 203 are relatively small spaces. In the present disclosure, a space with such dimensions that the average concentration of refrigerant is still below a reference value even when the whole amount of refrigerant in the air-conditioning apparatus 100 leaks is defined as "large space," while a space with such dimensions that the average concentration of refrigerant is equal to or greater than the reference value when the whole amount of refrigerant in the air-conditioning apparatus 100 leaks is defined as "small space." For example, the reference value is one-fourth of lower flammability limit (LFL) to refrigerant used in the air-conditioning apparatus 100. Note that the reference value is not limited to one-fourth of LFL.

Each of the indoor units 3a to 3d includes a space detector 35. The space detector 35 detects information regarding the volume of a space where each of the indoor units 3a to 3d is installed. The space detector 35 in the present embodiment is an infrared sensor configured to detect a thermal image of the room where each of the indoor units 3a to 3d is installed. The space detector 35 regularly detects and transmits the thermal image to a controller 6.

The air-conditioning apparatus 100 further includes a plurality of refrigerant shut-off units 5a to 5d, the controller 6, and a plurality of refrigerant sensors 7a to 7d. The refrigerant shut-off units 5a to 5d are connected to the indoor units 3a to 3d, respectively. In the present embodiment, four refrigerant shut-off units 5a to 5d are provided corresponding to the four indoor units 3a to 3d. The refrigerant shut-off units 5a to 5d are configured to shut off supply of refrigerant to the indoor units 3a to 3d, respectively.

The controller 6 is connected to the outdoor unit 1, the plurality of indoor units 3a to 3d, the plurality of refrigerant shut-off units 5a to 5d, and the plurality of refrigerant sensors 7a to 7d such that the controller 6 can communicate with these units. The controller 6 is provided in a control room or other rooms of the building where the air-conditioning apparatus 100 is installed. The controller 6 is constituted by a processing unit, such as a CPU, configured to execute programs stored in a memory, or by dedicated hardware such as an ASIC or an FPGA, or is constituted by both the processing unit and the dedicated hardware.

The refrigerant sensors 7a to 7d are provided corresponding to the indoor units 3a to 3d, respectively. In the present embodiment, four refrigerant sensors 7a to 7d are provided corresponding to the four indoor units 3a to 3d. Each of the refrigerant sensors 7a to 7d is, for example, a semiconductor gas detection sensor, and detects refrigerant gas used in the air-conditioning apparatus 100 or gas equivalent to the refrigerant gas. The refrigerant sensors 7a to 7d are installed below the indoor units 3a to 3d, respectively, to detect the concentration of refrigerant leaking from the indoor units 3a to 3d. Detection results from the refrigerant sensors 7a to 7d are transmitted to the controller 6.

FIG. 2 is a refrigerant circuit diagram of the air-conditioning apparatus 100 according to Embodiment 1. As illustrated in FIG. 2, a refrigerant circuit of the air-conditioning apparatus 100 is made by connecting the outdoor unit 1 to each of the indoor units 3a to 3d with the refrigerant pipes 4a and 4b. The refrigerant pipes 4a and 4b are provided with the refrigerant shut-off units 5a to 5b. The type of refrigerant used in the refrigerant circuit of the air-conditioning apparatus 100 is not particularly limited. Examples of the refrigerant used in the air-conditioning apparatus 100 include a natural refrigerant, such as carbon dioxide, hydrocarbon, or helium, a chlorine-free alternative refrigerant, such as HFC410A, HFC407C, or HFC404A, and a fluorocarbon refrigerant, such as R22 or R134a, that is used in the existing products.

The outdoor unit 1 includes a compressor 11, a flow switching valve 12, an outdoor heat exchanger 13, an outdoor fan 14, and an accumulator 15. The compressor 11 suctions low-temperature low-pressure gas refrigerant, compresses the suctioned gas refrigerant into a high-temperature high-pressure state, and discharges the compressed high-temperature high-pressure gas refrigerant. The compressor 11 causes refrigerant to circulate in the refrigerant circuit. For example, the compressor 11 is an inverter-type compressor with a controllable capacity.

The flow switching valve 12 is, for example, a four-way valve. The flow switching valve 12 switches between flow passages of refrigerant discharged from the compressor 11 depending on the operation of the indoor units 3a to 3d. The flow switching valve 12 is switched to a flow passage illustrated by the solid lines in FIG. 2 during heating operation, while being switched to another flow passage illustrated by the dotted lines in FIG. 2 during cooling operation. Note that the flow switching valve 12 may be a combination of three-way valves or two-way valves.

The outdoor heat exchanger 13 is, for example, a fin-and-tube heat exchanger. Through the outdoor heat exchanger 13, refrigerant exchanges heat with air supplied by the outdoor fan 14. The outdoor heat exchanger 13 serves as a condenser during cooling operation to condense the refrigerant into liquid form. The outdoor heat exchanger 13 serves as an evaporator during heating operation to evaporate the refrigerant into gas form.

The outdoor fan 14 is, for example, a propeller fan. The outdoor fan 14 supplies air around the outdoor unit 1 to the outdoor heat exchanger 13. The rotation speed of the outdoor fan 14 is controlled by the controller 6, thereby controlling the condensation capacity or evaporation capacity of the outdoor heat exchanger 13. The accumulator 15 is provided on the suction side of the compressor 11. The accumulator 15 has a function of separating the refrigerant into liquid refrigerant and gas refrigerant, and a function of storing surplus refrigerant.

Each of the refrigerant shut-off units 5a to 5d is provided between the outdoor unit 1 and each of the indoor units 3a to 3d. Each of the refrigerant shut-off units 5a to 5d includes a shut-off valve 51 and a shut-off valve 52. The shut-off valve 51 of each of the refrigerant shut-off units 5a to 5d is provided in the refrigerant pipe 4a, while the shut-off valve 52 of each of the refrigerant shut-off units 5a to 5d is provided in the refrigerant pipe 4b. By closing the shut-off valves 51 and 52 of each of the refrigerant shut-off units 5a to 5d, supply of refrigerant to each of the indoor units 3a to 3*d* is shut off. The shut-off valves 51 and 52 are configured to be opened during normal heating operation and cooling operation, while being closed when leakage of refrigerant is detected.

Each of the indoor units 3*a* to 3*d* supplies cooling energy or heating energy from the outdoor unit 1 to a cooling load or a heating load in the air-conditioning target space. Each of the indoor units 3*a* to 3*d* includes an indoor heat exchanger 31, an expansion device 32, and an indoor fan 33. The indoor heat exchanger 31 is, for example, a fin-and-tube heat exchanger. Through the indoor heat exchanger 31, refrigerant exchanges heat with air supplied by the indoor fan 33. The indoor heat exchanger 31 serves as a condenser during heating operation to condense the refrigerant into liquid form. The indoor heat exchanger 31 serves as an evaporator during cooling operation to evaporate the refrigerant into gas form.

The expansion device 32 is, for example, an electronic expansion valve whose opening degree is variably controlled. The expansion device 32 is connected in series to the indoor heat exchanger 31 to reduce the pressure of refrigerant flowing out from the indoor heat exchanger 31 or the pressure of refrigerant flowing into the indoor heat exchanger 31 to expand the refrigerant.

The indoor fan 33 is, for example, a cross flow fan. The indoor fan 33 supplies air in the air-conditioning target space to the indoor heat exchanger 31. The rotation speed of the indoor fan 33 is controlled by the controller 6, thereby controlling the condensation capacity or evaporation capacity of the indoor heat exchanger 31.

The air-conditioning apparatus 100 in the present embodiment performs cooling operation and heating operation. The solid arrows in FIG. 2 illustrate a flow of refrigerant during the heating operation, while the dotted arrows in FIG. 2 illustrate a flow of refrigerant during the cooling operation. A flow of refrigerant in each operation is described below.

In the heating operation, high-temperature high-pressure gas refrigerant discharged from the compressor 11 passes through the flow switching valve 12 and flows out from the outdoor unit 1, and then passes through the refrigerant pipe 4*b* and flows into each of the indoor units 3*a* to 3*d*. The refrigerant having flowed into each of the indoor units 3*a* to 3*d* exchanges heat with air supplied by the indoor fan 33 through the indoor heat exchanger 31, and then condenses into liquid form. At this time, the refrigerant transfers heat to the air in the air-conditioning target space, so that the rooms 201, 202, and 203 in which the indoor units 3*a* to 3*d* are installed are heated. The refrigerant having flowed out from the indoor heat exchanger 31 is reduced in pressure by the expansion device 32 and flows out from the indoor units 3*a* to 3*d*. Then, the refrigerant passes through the refrigerant pipe 4*a* and flows into the outdoor unit 1.

The refrigerant having flowed into the outdoor unit 1 enters the outdoor heat exchanger 13. The refrigerant having flowed into the outdoor heat exchanger 13 exchanges heat with air supplied by the outdoor fan 14, and then evaporates into gas form. The refrigerant having flowed out from the outdoor heat exchanger 13 is suctioned again into the compressor 11 via the flow switching valve 12 and the accumulator 15.

In the cooling operation, high-temperature high-pressure gas refrigerant discharged from the compressor 11 passes through the flow switching valve 12 and flows into the outdoor heat exchanger 13. The refrigerant having flowed into the outdoor heat exchanger 13 exchanges heat with air supplied by the outdoor fan 14, and then condenses into liquid form. The refrigerant having flowed out from the outdoor heat exchanger 13 passes through the refrigerant pipe 4*a* and flows into each of the indoor units 3*a* to 3*d*.

The refrigerant having flowed into each of the indoor units 3*a* to 3*d* is reduced in pressure by the expansion device 32 and becomes low-temperature two-phase gas-liquid refrigerant to flow into the indoor heat exchanger 31. The refrigerant having flowed into the indoor heat exchanger 31 exchanges heat with air supplied by the indoor fan 33, and then evaporates into gas form. At this time, the refrigerant receives heat from the air in the air-conditioning target space, so that the rooms 201, 202, and 203 in which the indoor units 3*a* to 3*d* are installed are cooled.

The refrigerant having flowed out from the indoor heat exchanger 31 passes through the refrigerant pipe 4*b* and flows into the outdoor unit 1. The refrigerant having flowed into the outdoor unit 1 is suctioned again into the compressor 11 via the flow switching valve 12 and the accumulator 15.

Each of the refrigerant sensors 7*a* to 7*d* detects a refrigerant concentration around the sensor during the heating operation or the cooling operation, and transmits a detection result to the controller 6. Note that the detection results from the refrigerant sensors 7*a* to 7*d* may be transmitted to the controller 6 through the indoor units 3*a* to 3*d*, respectively. When any of the refrigerant sensors 7*a* to 7*d* detects a refrigerant concentration that is equal to or greater than a preset threshold, the controller 6 closes the shut-off valves 51 and 52 of any corresponding one of the refrigerant shut-off units 5*a* to 5*d*. For example, the refrigerant concentration detected by the refrigerant sensor 7*c* is equal to or greater than the preset threshold, the controller 6 closes the shut-off valves 51 and 52 of the refrigerant shut-off unit 5*c* corresponding to the refrigerant sensor 7*c*. With this control, supply of refrigerant to the indoor unit 3*c* is shut off, which can avoid the refrigerant concentration in the room 202 from exceeding the reference value.

Figure 3:
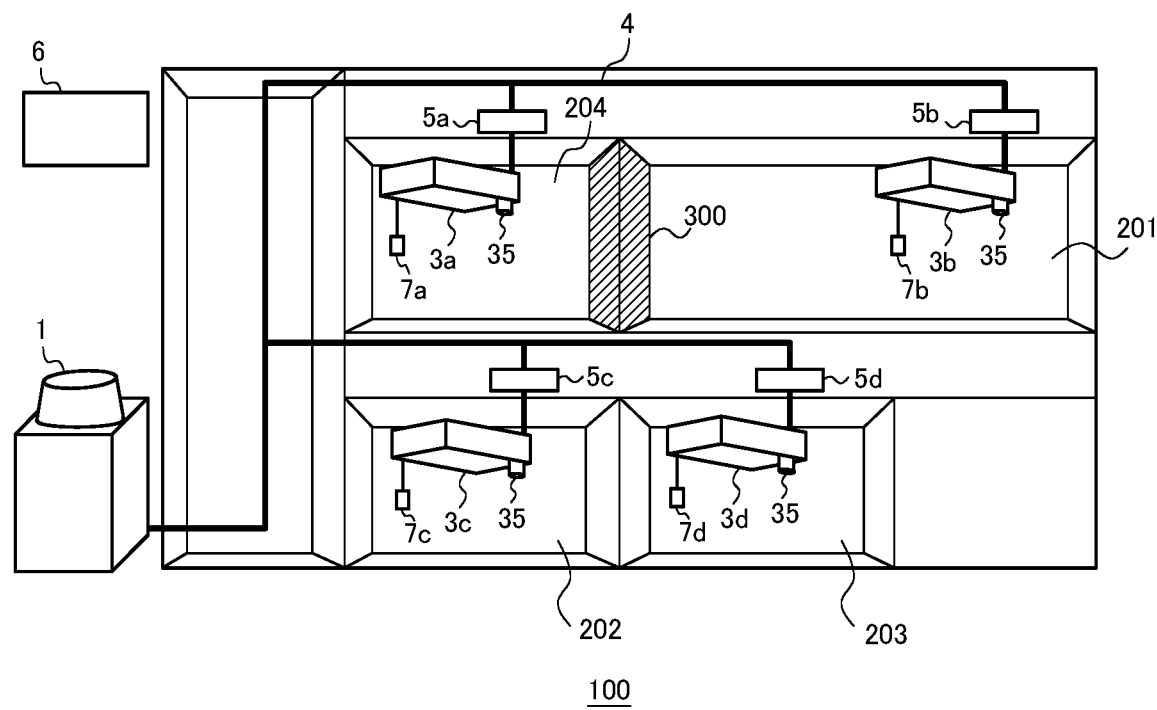
FIG. 3 is an explanatory diagram describing a change in space volume of a room.

Since the indoor units 3*a* and 3*b* are installed in the room 201 defined as a large space, the indoor units 3*a* and 3*b* are not required to be provided with safety measures for leakage of refrigerant. However, there is a case where the room 201, which had been a large space at the time of installation of the indoor units 3*a* and 3*b*, may be changed into a small space after the installation for users' convenience. FIG. 3 is an explanatory diagram describing a change in space volume of the room 201. As illustrated in FIG. 3, in the room 201, when a partition 300 is additionally provided in between the indoor unit 3*a* and the indoor unit 3*b*, a room 204 in which the indoor unit 3*a* is installed may be defined as a small space. In this case, the indoor unit 3*a* is required to be provided with safety measures for leakage of refrigerant. In view of that, the air-conditioning apparatus 100 in the present embodiment determines the volume of a space where each indoor unit is installed, and executes control appropriate to the volume of the space.

Figure 4:
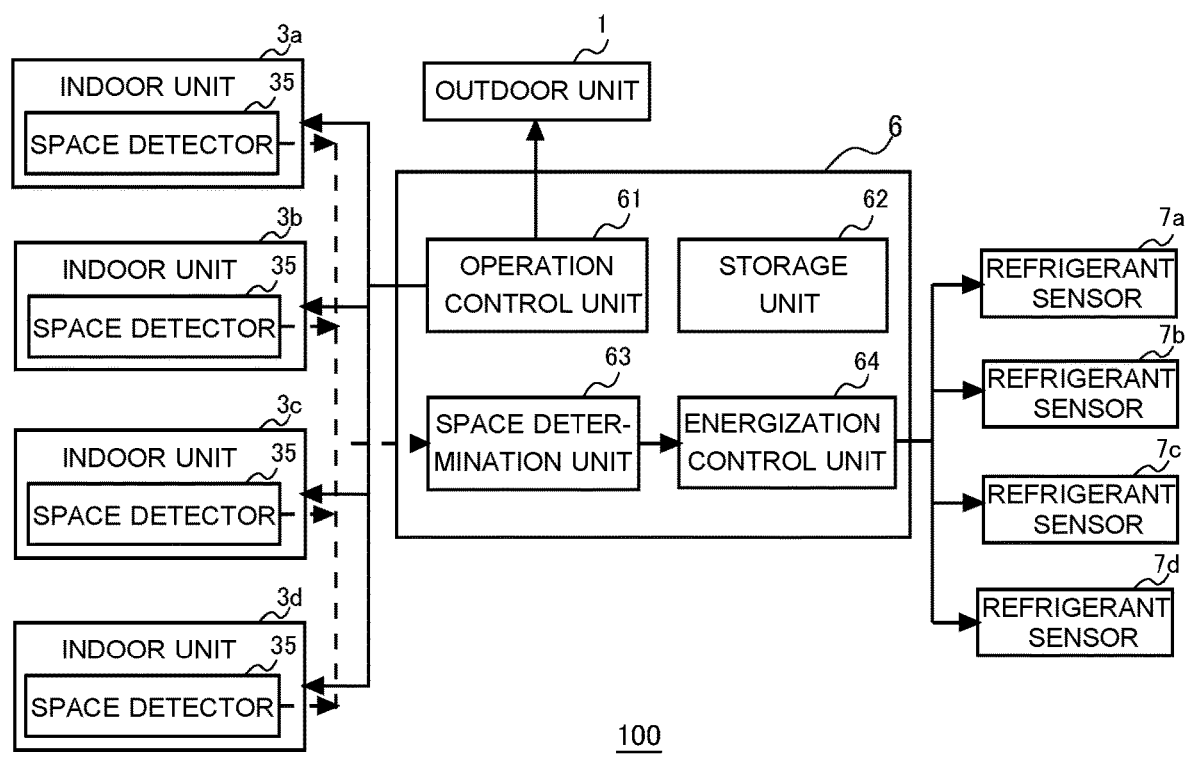
FIG. 4 is a control block diagram of the air-conditioning apparatus according to Embodiment 1.

FIG. 4 is a control block diagram of the air-conditioning apparatus 100 according to Embodiment 1. As illustrated in FIG. 4, the controller 6 includes an operation control unit 61, a storage unit 62, a space determination unit 63, and an energization control unit 64. The operation control unit 61, the space determination unit 63, and the energization control unit 64 are functional units that are implemented by the controller 6 by executing the programs or by a dedicated processing circuit.

The operation control unit 61 controls each of the devices in the outdoor unit 1 and the indoor units 3*a* to 3*d* to perform the cooling operation or the heating operation. For example, the operation control unit 61 controls the driving frequency of the compressor 11, the flow passage of the flow switching valve 12, the rotation speeds of the outdoor fan 14 and the indoor fan 33, and the opening degree of the expansion device 32 based on the refrigerant temperature, the pressure, the outside air temperature, and an instruction input from a remote control or other devices.

The storage unit 62 is, for example, a nonvolatile or volatile semiconductor memory such as a RAM, a ROM, or a flash memory. The storage unit 62 stores setting information, control information, and various parameters that are used for a space determination in the air-conditioning apparatus 100.

The space determination unit 63 determines whether or not a space where each of the indoor units 3a to 3d is installed is a small space based on the detection result from the space detector 35 in each of the indoor units 3a to 3d. The space determination unit 63 calculates a floor area in the space by analyzing a thermal image received from the space detector 35, and multiplies the floor area by a height of the room to calculate a volume of the space where each of the indoor units 3a to 3d is installed. The height of the room is, for example, 1.8 meters. Information on the height of the room is stored in the storage unit 62 in advance. When the calculated volume is less than a preset threshold, the space determination unit 63 determines that the space is a small space. When the calculated volume is equal to or greater than the preset threshold, the space determination unit 63 determines that the space is a large space. For example, the threshold is a volume of the space where the average concentration of refrigerant is below the reference value (LFL/4) when the whole amount of refrigerant in the air-conditioning apparatus 100 leaks.

The energization control unit 64 controls energization of the refrigerant sensors 7a to 7d based on the determination results of the space determination unit 63. For example, when the indoor unit 3a is installed in a large space, the indoor unit 3a is not required to be provided with safety measures for leakage of refrigerant and it is thus unnecessary to energize the refrigerant sensor 7a. In contrast, when the indoor unit 3a is installed in a small space, the indoor unit 3a is required to be provided with safety measures for leakage of refrigerant and it is thus necessary to energize the refrigerant sensor 7a. In view of that, based on a determination result from the space determination unit 63, the energization control unit 64 energizes a refrigerant sensor corresponding to an indoor unit installed in a small space, and stops energization of a refrigerant sensor corresponding to an indoor unit installed in a large space.

Figure 5:
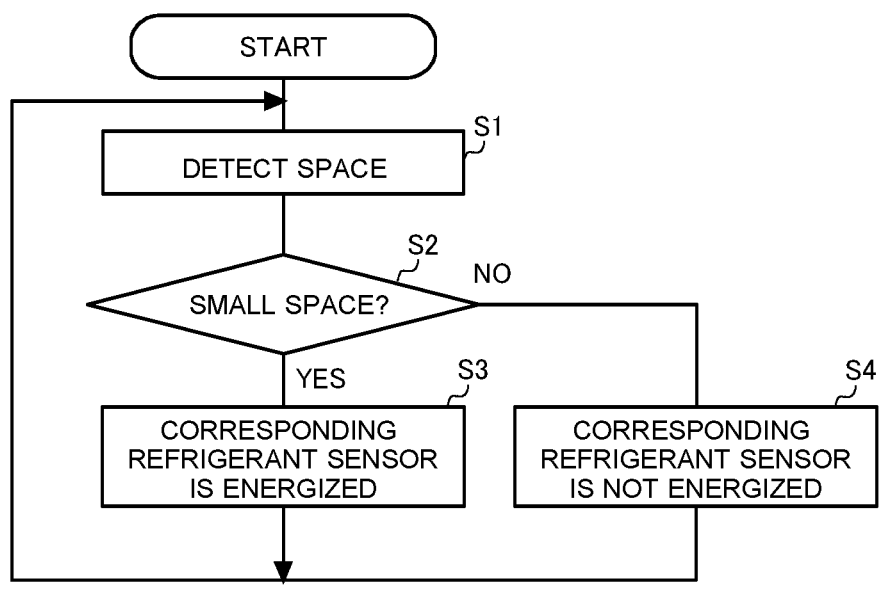
FIG. 5 is a flowchart illustrating operation of the air-conditioning apparatus according to Embodiment 1.

FIG. 5 is a flowchart illustrating operation of the air-conditioning apparatus 100 according to Embodiment 1. The processing to be performed on the indoor unit 3a is explained below as an example. Note that the same processing is also performed on the indoor units 3b to 3d. As illustrated in FIG. 5, firstly, the space detector 35 in the indoor unit 3a detects a space where the indoor unit 3a is installed (S1). Then, the space determination unit 63 determines whether or not the space where the indoor unit 3a is installed is a small space based on the detection result of the space detector 35 (S2). The space determination unit 63 calculates the volume of the space where the indoor unit 3a is installed based on the detection result received from the space detector 35. And the space determination unit 63 determines that this space is a small space when the volume is less than the preset threshold.

When the space where the indoor unit 3a is installed is a small space (S2: YES), the refrigerant sensor 7a is energized (S3). In contrast, when the space where the indoor unit 3a is installed is not a small space (S2: NO), the refrigerant sensor 7a is not energized (S4). This avoids the refrigerant sensor 7a for the indoor unit 3a that had been initially installed in a large space from being energized at the time of the installation, and can accordingly reduce unnecessary power consumption. In addition, when the space where the indoor unit 3a is installed is changed into a small space after the installation, the refrigerant sensor 7a is energized. It is thus possible to detect refrigerant leakage and ensure safety.

As described above, in the air-conditioning apparatus 100 in the present embodiment, the space where each of the indoor units 3a to 3d is installed is regularly detected to control energization of each of the refrigerant sensors 7a to 7d depending on the volume of the space. With this control, even when the large space is changed into a small space after the installation of the indoor units, it is still possible to detect refrigerant leakage. With this detection, even when there is a change in the volume of the air-conditioning target space, it is still possible to ensure safety for refrigerant leakage. When the indoor unit is installed in the large space, energization of the refrigerant sensor is stopped, so that unnecessary power consumption is reduced and the refrigerant sensor can achieve long-operating life.

In the air-conditioning apparatus 100 in the present embodiment, regardless of the volume of the space where each of the indoor units 3a to 3d is installed, the refrigerant shut-off units 5a to 5d are provided in advance corresponding to the indoor units 3a to 3d, respectively. There is a case where the refrigerant shut-off units 5a and 5b are not provided in advance because the indoor units 3a and 3b are installed in a large space. In that case, when the large space is changed into a small space, it is required to add refrigerant shut-off units, which involves refrigerant recovery and other work, and consequently requires a considerable amount of workload and work time. In contrast to this, in the air-conditioning apparatus 100 in the present embodiment, even when the indoor units 3a to 3d are installed in the large space, and thereafter this large space is changed into a small space, it is still possible to shut off supply of refrigerant at the time of refrigerant leakage without adding refrigerant shut-off units.

Embodiment 2

Figure 6:
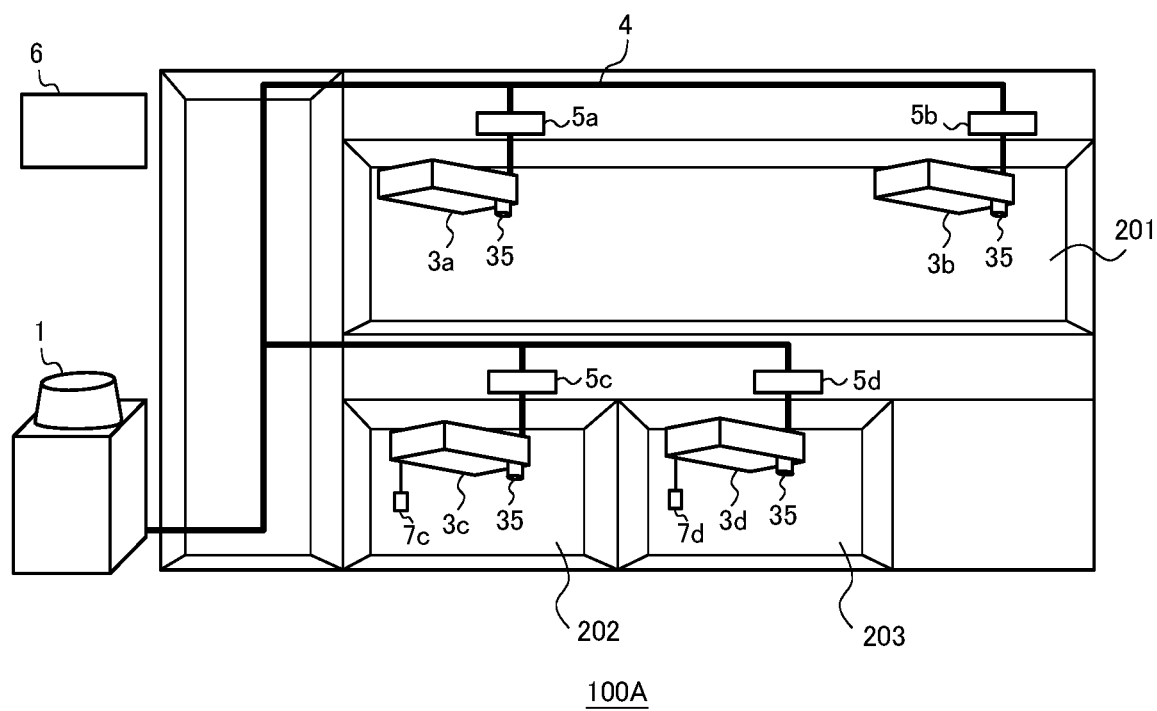
FIG. 6 is a schematic configuration diagram of an air-conditioning apparatus according to Embodiment 2.

Embodiment 2 is described below. FIG. 6 is a schematic configuration diagram of an air-conditioning apparatus 100A according to Embodiment 2. As illustrated in FIG. 6, the air-conditioning apparatus 100A in Embodiment 2 is different from Embodiment 1 in that the indoor units 3a and 3b installed in the room 201 defined as a large space are not provided with their corresponding refrigerant sensors. Other than the above, the air-conditioning apparatus 100A has the same configuration as that in Embodiment 1.

Figure 7:
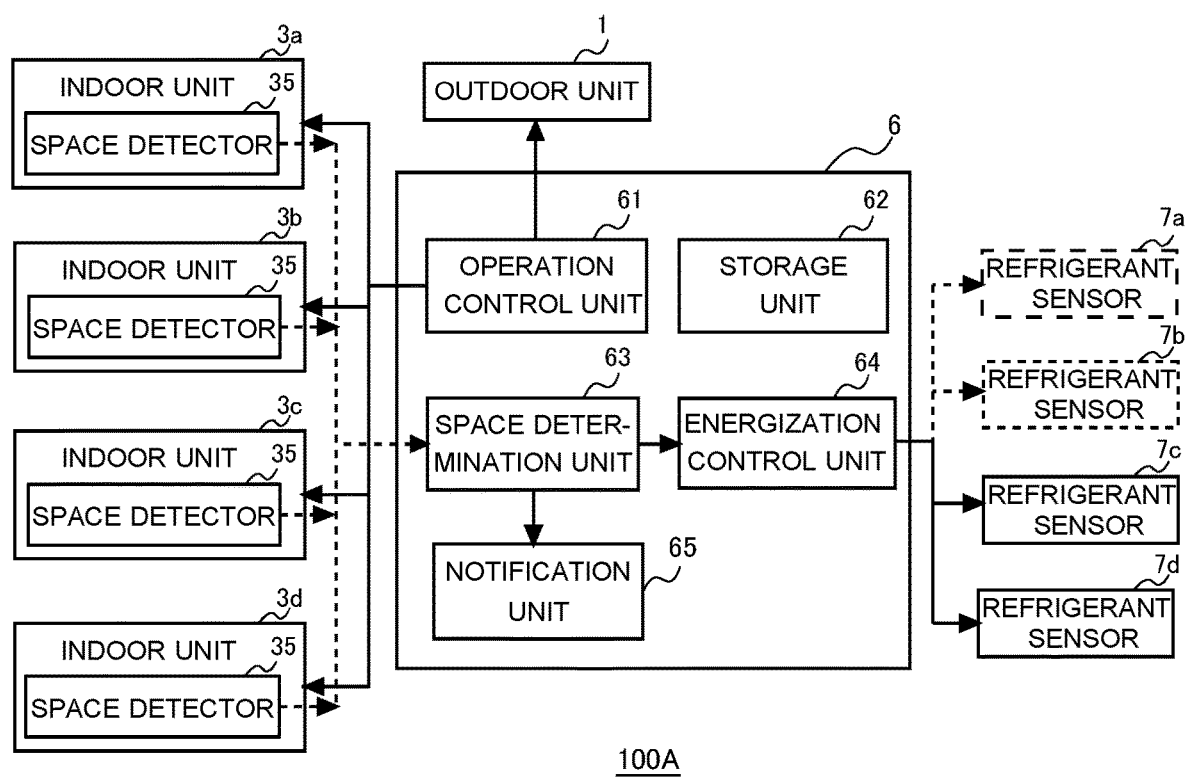
FIG. 7 is a control block diagram of the air-conditioning apparatus according to Embodiment 2.

FIG. 7 is a control block diagram of the air-conditioning apparatus 100A according to Embodiment 2. As illustrated in FIG. 7, the controller 6 in the present embodiment is different from Embodiment 1 in that the controller 6 includes a notification unit 65. The notification unit 65 is a display device or a speaker configured to give notification by light, text, image, or sound. The notification unit 65 provides a notification to users when the space determination unit 63 determines that the space where any of the indoor units 3a to 3d is installed is changed into a small space. The notification includes information that can identify which of the indoor units 3a to 3d is supposed to be installed in the small space, and information indicating that the identified indoor unit is supposed to be installed in the small space.

In the present embodiment, as illustrated in, for example, FIG. 3, when the space in which the indoor unit 3a is installed becomes a small space due to addition of a partition 300, an administrator is notified that the space in which the indoor unit 3a is installed has become a small space. Based on the notification, the administrator determines that the indoor unit 3a is required to be provided with safety measures for refrigerant leakage, and additionally installs the refrigerant sensor 7a in the room 204 to detect leakage of refrigerant from the indoor unit 3a. Energization of the refrigerant sensor 7a is controlled in the same manner as in Embodiment 1.

In the present embodiment, the same effects as those in Embodiment 1 can also be obtained. Additionally, at the time of installation of the air-conditioning apparatus, unnecessary facilities can be eliminated, which makes it possible to reduce installation costs. Note that the controller 6 is provided with the notification unit 65 in the above descriptions, however, each of the indoor units 3a to 3d may be provided with the notification unit 65.

Embodiment 3

Figure 8:
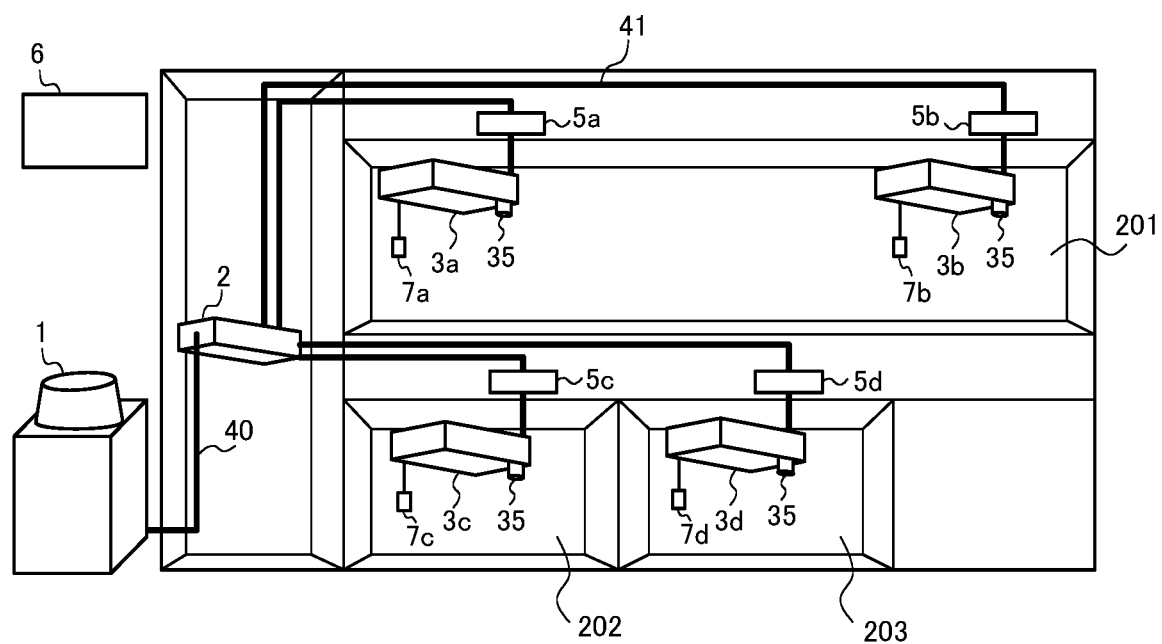
FIG. 8 is a schematic configuration diagram of an air-conditioning apparatus according to Embodiment 3.

Embodiment 3 is described below. FIG. 8 is a schematic configuration diagram of an air-conditioning apparatus 100B according to Embodiment 3. As illustrated in FIG. 8, the air-conditioning apparatus 100B in Embodiment 3 includes an outdoor unit 1A, a relay unit 2, the plurality of indoor units 3a to 3d, the plurality of refrigerant shut-off units 5a to 5d, the controller 6, and the plurality of refrigerant sensors 7a to 7d. The outdoor unit 1 and the relay unit 2 are connected by a refrigerant pipe 40. Each of the indoor units 3a to 3d is connected to the relay unit 2 by refrigerant pipes 41. The refrigerant pipe 40 includes refrigerant pipes 40a and 40b that will be described later (FIG. 9).

Figure 9:
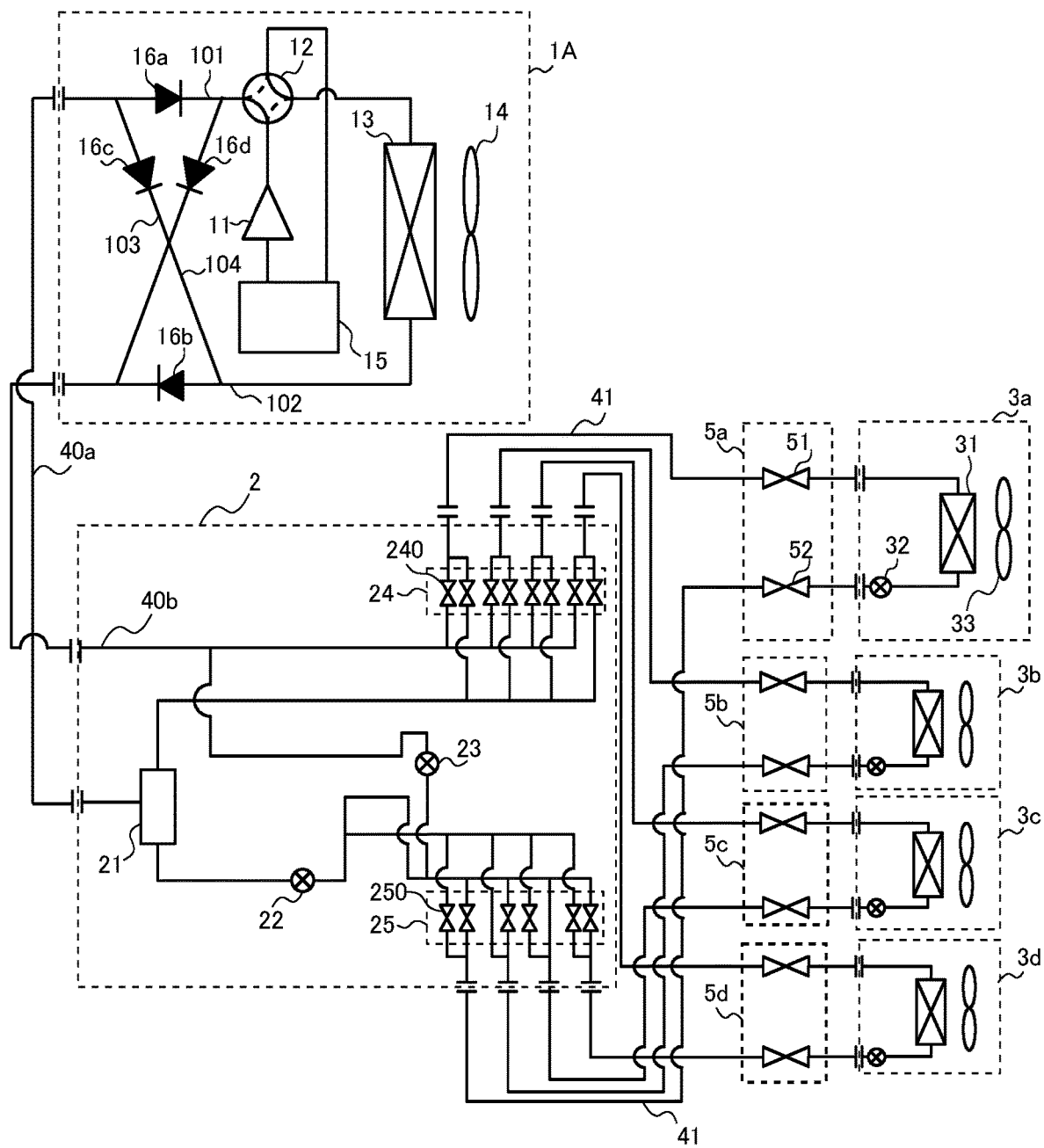
FIG. 9 is a refrigerant circuit diagram of the air-conditioning apparatus according to Embodiment 3.

FIG. 9 is a refrigerant circuit diagram of the air-conditioning apparatus 100B according to Embodiment 3. The outdoor unit 1A includes the compressor 11, the flow switching valve 12, the outdoor heat exchanger 13, the outdoor fan 14, the accumulator 15, and a plurality of check valves 16a to 16d. The configurations of the compressor 11, the flow switching valve 12, the outdoor heat exchanger 13, the outdoor fan 14, and the accumulator 15 are the same as those in Embodiment 1.

The check valves 16a to 16d are provided respectively in a low-pressure pipe 101 through which low-pressure refrigerant flows, a high-pressure pipe 102 through which high-pressure refrigerant flows, and two connection pipes 103 and 104. Each of the connection pipes 103 and 104 connects the low-pressure pipe 101 and the high-pressure pipe 102. Providing the check valves 16a to 16d in this manner allows refrigerant to flow through two refrigerant pipes 40a and 40b connecting the outdoor unit 1 and the relay unit 2 in one direction regardless of the operation mode.

The relay unit 2 is connected to the outdoor unit 1 by the refrigerant pipes 40a and 40b, while being connected to each of the indoor units 3a to 3d by the refrigerant pipes 41. The relay unit 2 divides refrigerant from the outdoor unit 1 into flows to the indoor units 3a to 3d, and also merges flows of refrigerant from the indoor units 3a to 3d to deliver the merged flows of refrigerant to the outdoor unit 1. The relay unit 2 includes a gas-liquid separator 21, a plurality of expansion devices 22 and 23, and a plurality of flow dividers 24 and 25.

The gas-liquid separator 21 separates refrigerant flowing therein into a gas portion and a liquid portion. The gas-liquid separator 21 is connected to the flow dividers 24 and 25, while being connected to the refrigerant pipe 40a connected to the low-pressure pipe 101 in the outdoor unit 1. The expansion devices 22 and 23 are, for example, electronic expansion valves whose opening degree is variably controlled. The expansion devices 22 and 23 are connected to the flow divider 25. The expansion device 22 regulates the flow rate of refrigerant flowing out from the flow divider 25 and flowing into the gas-liquid separator 21. The expansion device 23 regulates the flow rate of refrigerant flowing out from the refrigerant pipe 4a and flowing into the flow divider 25.

The flow dividers 24 and 25 are provided at flow division ports of the relay unit 2. The flow divider 24 includes a plurality of opening-closing valves 240. The plurality of opening-closing valves 240 are connected to the indoor units 3a to 3d at their one end. In the present embodiment, two opening-closing valves 240 are connected to each of the indoor units 3a to 3d. The flow divider 25 includes a plurality of opening-closing valves 250. The plurality of opening-closing valves 250 are connected to the indoor units 3a to 3d at their other end. In the present embodiment, two opening-closing valves 250 are connected to each of the indoor units 3a and 3d, while one opening-closing valve 250 is connected to each of the indoor units 3b and 3c. Each opening-closing valve of the flow dividers 24 and 25 is opened/closed, thereby to switch between the flow passages of refrigerant flowing through the indoor units 3a to 3d.

The configuration of the refrigerant shut-off units 5a to 5d and the configuration of the indoor units 3a to 3d are the same as those in Embodiment 1. The shut-off valve 51 of each of the refrigerant shut-off units 5a to 5d is provided in the refrigerant pipe 41 connected to the flow divider 24, while the shut-off valve 52 of each of the refrigerant shut-off units 5a to 5d is provided in the refrigerant pipe 41 connected to the flow divider 25.

The air-conditioning apparatus 100B in the present embodiment operates in a cooling only operation mode, a heating only operation mode, or a cooling/heating simultaneous operation mode. The controller 6 of the air-conditioning apparatus 100B receives a cooling operation instruction or a heating operation instruction for the indoor units 3a to 3d from a remote control or other devices corresponding to each of the indoor units 3a to 3d. In response to the received instruction, the controller 6 enters any of the operation modes. Specifically, when all of the indoor units 3a to 3d perform cooling operation, the controller 6 enters the cooling only operation mode, and when all of the indoor units 3a to 3d perform heating operation, the controller 6 enters the heating only operation mode. The controller 6 enters the cooling/heating simultaneous operation mode when any of the indoor units 3a to 3d performs cooling operation, while the others perform heating operation.

The controller 6 of the air-conditioning apparatus 100B in the present embodiment also regularly detects the space where each of the indoor units 3a to 3d is installed, and also controls energization of each of the refrigerant sensors 7a to 7d depending on the volume of the space in the same manner as in Embodiment 1. Therefore, even the air-conditioning apparatus 100B including the relay unit 2 as described in the present embodiment can still obtain the same effects as those in Embodiment 1.

Figure 10:
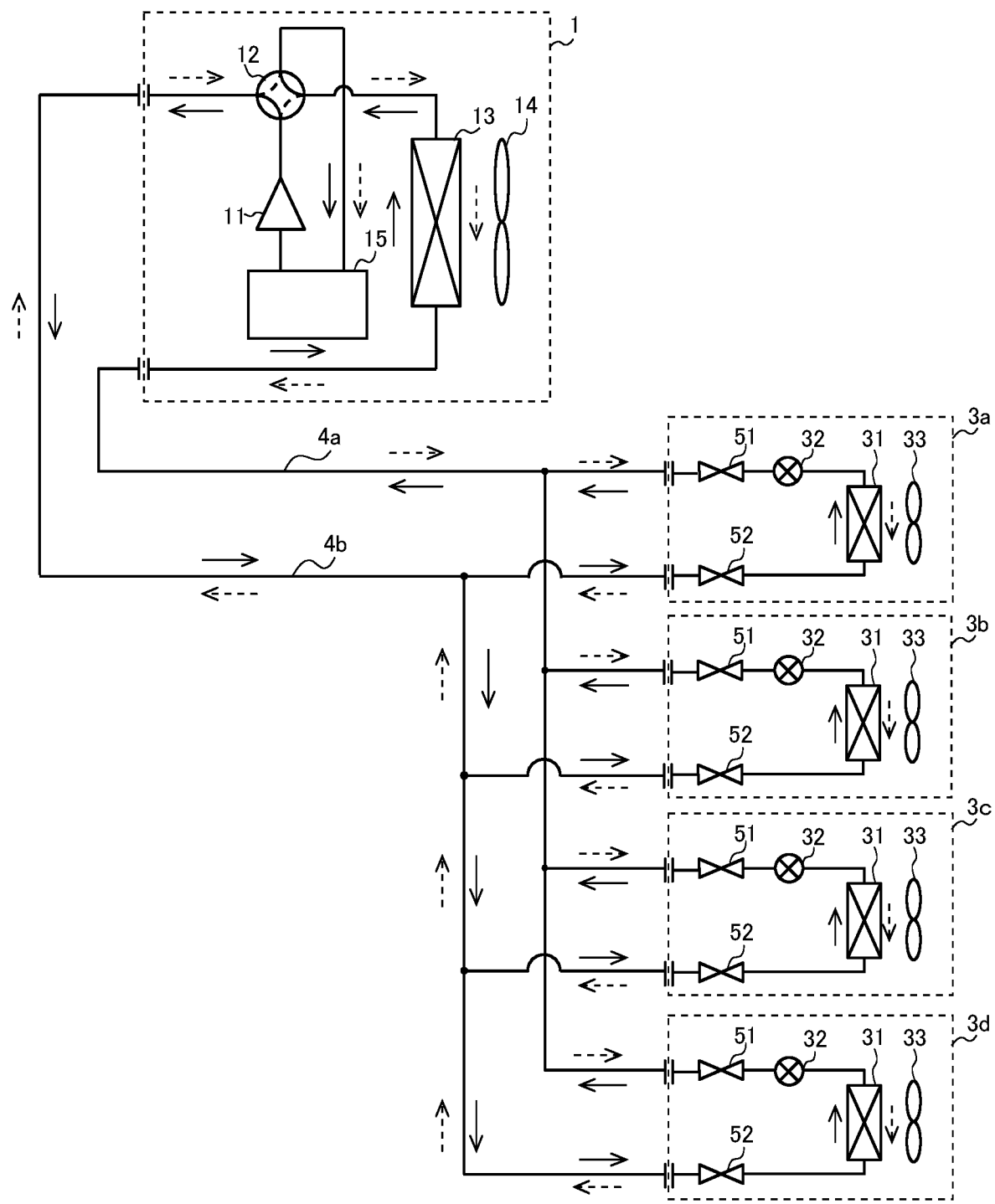
FIG. 10 is a refrigerant circuit diagram of an air-conditioning apparatus according to a modification.

While the embodiments have been described above, the present disclosure is not limited to the embodiments described above, and can be variously modified or combined without departing from the scope of the present disclosure. For example, the refrigerant shut-off units 5a to 5d are not limited to the configuration described in the above embodiments. FIG. 10 is a refrigerant circuit diagram of an air-conditioning apparatus 100C according to a modification. As illustrated in FIG. 10, each of the indoor units 3a to 3d may be provided with the shut-off valves 51 and 52. Alternatively, in a case where the air-conditioning apparatus 100C includes the relay unit 2 similarly to the air-conditioning apparatus 100B in Embodiment 3, the flow dividers 24 and 25 of the relay unit 2 may have a refrigerant shut-off function. That is, the refrigerant shut-off units 5a to 5d may be configured independently, or the indoor units 3a to 3d or the relay unit 2 may include the refrigerant shut-off units 5a to 5d.

The controller 6 of the air-conditioning apparatus 100 may control enablement of the function of the refrigerant shut-off units 5a to 5d in addition to controlling energization of the refrigerant sensors 7a to 7b in response to the detection result from the space detector 35. More specifically, the controller 6 disables the function of the refrigerant shut-off units 5a and 5b corresponding to the indoor units 3a and 3b installed in a large space, while enabling the function of the refrigerant shut-off units 5c and 5d corresponding to the indoor units 3c and 3d installed in small spaces. When the large space where the indoor units 3a and 3b are installed is changed into small spaces, the controller 6 enables the function of the refrigerant shut-off units 5a and 5b. The function of the refrigerant shut-off units 5a and 5b is enabled/disabled based on the settings for the refrigerant shut-off units 5a and 5b. This prevents the shut-off valves 51 and 52 in each of the refrigerant shut-off units 5a to 5b from unnecessarily functioning as safety measures, so that the shut-off valves 51 and 52 can achieve long-operating life.

In the above embodiments, the controller 6 is provided separately from the outdoor unit 1, the relay unit 2, and the indoor units 3a to 3d. However, any of the outdoor unit 1, the relay unit 2, and the indoor units 3a to 3d may include the controller 6. Alternatively, the controller 6 may be divided into sub-controllers according to the functions, so that the sub-controllers may be provided separately for each of the outdoor unit 1, the relay unit 2, and the indoor units 3a to 3d. In that case, it is preferable that the sub-controllers are connected to each other with wire or wirelessly such that they can communicate with each other. In this case, the indoor units 3a to 3d may control the refrigerant shut-off units 5a to 5d, respectively.

Further, the space detector 35 is not limited to being an infrared sensor. It is sufficient that the space detector 35 can at least detect information regarding the volume of a space where each of the indoor units 3a to 3d is installed. For example, the space detector 35 may be a camera configured to capture an image of the space where each of the indoor units 3a to 3d is installed. In this case, the space determination unit 63 calculates the floor area by analyzing the image to calculate the volume of the space where each of the indoor units 3a to 3d is installed. For another example, the space detector 35 may be a temperature sensor configured to detect a temperature of the space where each of the indoor units 3a to 3d is installed. In this case, the space determination unit 63 calculates the volume of the space where each of the indoor units 3a to 3d is installed based on the rate of change in the temperature detected by the temperature sensor.

The invention claimed is:

1. An air-conditioning apparatus comprising:
an indoor unit configured to cool or heat an air-conditioning target space;
an outdoor unit configured to supply heating energy or cooling energy to the indoor unit;
a refrigerant shut-off unit configured to shut off supply of refrigerant to the indoor unit;
a refrigerant sensor configured to detect refrigerant leaking from the indoor unit;
a space detector configured to regularly detect information regarding a volume of a space where the indoor unit is installed as a detection result, and transmit the detection result; and
a controller configured to:
receive the detection result from the space detector,
determine whether or not the space where the indoor unit is installed is a small space based on the detection result from the space detector, and
responsive to determining that the space where the indoor unit is installed is the small space, energize the refrigerant sensor.

2. An air-conditioning apparatus comprising:
an indoor unit configured to cool or heat an air-conditioning target space;
an outdoor unit configured to supply heating energy or cooling energy to the indoor unit;
a refrigerant shut-off unit configured to shut off supply of refrigerant to the indoor unit;
a refrigerant sensor configured to detect refrigerant leaking from the indoor unit;
a space detector configured to detect information regarding a volume of a space where the indoor unit is installed as a detection result, and transmit the detection result; and
a controller configured to:
receive the detection result from the space detector,
determine whether or not the space where the indoor unit is installed is a small space based on the detection result from the space detector,
responsive to determining that the space where the indoor unit is installed is the small space, energize the refrigerant sensor, and
responsive to determining that the space where the indoor unit is installed is not the small space, deenergize the refrigerant sensor.

3. The air-conditioning apparatus of claim 1, further comprising a notification unit configured to, responsive to determining that the space where the indoor unit is installed is the small space, notify that the space where the indoor unit is installed is the small space.

4. The air-conditioning apparatus of claim 1,
wherein the refrigerant shut-off unit is provided between the outdoor unit and the indoor unit.

5. The air-conditioning apparatus of claim 1,
wherein the refrigerant shut-off unit is provided in the indoor unit.

6. The air-conditioning apparatus of claim 1,
further comprising a relay unit provided between the outdoor unit and the indoor unit,
wherein the refrigerant shut-off unit is provided in the relay unit.

7. An air-conditioning apparatus comprising:
an indoor unit configured to cool or heat an air-conditioning target space;
an outdoor unit configured to supply heating energy or cooling energy to the indoor unit;
a refrigerant shut-off unit configured to shut off supply of refrigerant to the indoor unit;
a refrigerant sensor configured to detect refrigerant leaking from the indoor unit;

a space detector configured to detect information regarding a volume of a space where the indoor unit is installed as a detection result, and transmit the detection result; and a controller configured to:
receive the detection result from the space detector,
determine whether or not the space where the indoor unit is installed is a small space based on the detection result from the space detector, and
responsive to determining that the space where the indoor unit is installed is the small space, energize the refrigerant sensor,
wherein the information regarding the volume of the space where the indoor unit is installed is an image or a temperature of the space where the indoor unit is installed.

8. The air-conditioning apparatus of claim 1, wherein the controller is further configured to, responsive to the refrigerant sensor detecting that the refrigerant is leaking, control the refrigerant shut-off unit corresponding to the refrigerant sensor to be closed.

9. The air-conditioning apparatus of claim 2, further comprising a notification unit configured to, responsive to determining that the space where the indoor unit is installed is the small space, notify that the space where the indoor unit is installed is the small space.

10. The air-conditioning apparatus of claim 2,
wherein the refrigerant shut-off unit is provided between the outdoor unit and the indoor unit.

11. The air-conditioning apparatus of claim 2,
wherein the refrigerant shut-off unit is provided in the indoor unit.

12. The air-conditioning apparatus of claim 2,
further comprising a relay unit provided between the outdoor unit and the indoor unit,
wherein the refrigerant shut-off unit is provided in the relay unit.

13. The air-conditioning apparatus of claim 2, wherein the controller is further configured to, responsive to the refrigerant sensor detecting that the refrigerant is leaking, control the refrigerant shut-off unit corresponding to the refrigerant sensor to be closed.

14. The air-conditioning apparatus of claim 7, further comprising a notification unit configured to, responsive to determining that the space where the indoor unit is installed is the small space, notify that the space where the indoor unit is installed is the small space.

15. The air-conditioning apparatus of claim 7,
wherein the refrigerant shut-off unit is provided between the outdoor unit and the indoor unit.

16. The air-conditioning apparatus of claim 7,
wherein the refrigerant shut-off unit is provided in the indoor unit.

17. The air-conditioning apparatus of claim 7,
further comprising a relay unit provided between the outdoor unit and the indoor unit,
wherein the refrigerant shut-off unit is provided in the relay unit.

18. The air-conditioning apparatus of claim 7, wherein the controller is further configured to, responsive to the refrigerant sensor detecting that the refrigerant is leaking, control the refrigerant shut-off unit corresponding to the refrigerant sensor to be closed.

* * * * *